(12) United States Patent
Yoshizaki

(10) Patent No.: US 12,739,150 B2
(45) Date of Patent: Sep. 15, 2026

(54) METHODS, SYSTEMS, AND DEVICES FOR SIMULATING A CONNECTION BETWEEN A VEHICLE CONNECTOR AND AN ACCESSORY SYSTEM

(71) Applicant: Toyota Motor Engineering & Manufacturing North America, Inc., Plano, TX (US)

(72) Inventor: Coh L. Yoshizaki, Wixom, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 16 days.

(21) Appl. No.: 18/739,046

(22) Filed: Jun. 10, 2024

(65) Prior Publication Data

US 2025/0379765 A1 Dec. 11, 2025

(51) Int. Cl.
*H04L 12/40* (2006.01)

(52) U.S. Cl.
CPC .................. *H04L 12/40123* (2013.01); *H04L 2012/40215* (2013.01); *H04L 2012/40273* (2013.01)

(58) Field of Classification Search
CPC ................................................ H04L 12/40123
See application file for complete search history.

(56) References Cited

U.S. PATENT DOCUMENTS 7,359,773 B2 4/2008 Simon et al.
7,915,371 B2 3/2011 Byrd et al.
9,140,219 B2 9/2015 Senda et al.
10,824,765 B2 11/2020 Thompson
11,177,953 B2 11/2021 Zeh et al.
11,865,936 B2 * 1/2024 Hagenmaier, Jr. .... G06F 21/575
2015/0258893 A1 9/2015 Gray
2017/0126428 A1 * 5/2017 Paryani ............ H04L 12/40013
(Continued)

FOREIGN PATENT DOCUMENTS

CN 115981953 A 4/2023
CN 115981959 A 4/2023
(Continued)

*Primary Examiner* — Henry Tsai
*Assistant Examiner* — Aurangzeb Hassan
(74) *Attorney, Agent, or Firm* — Snell & Wilmer LLP

(57) ABSTRACT

Methods, systems, and devices for simulating a connection between a vehicle and an accessory system. A system may include a bus connector configured to connect with the accessory system. The system may include a plurality of transceivers and one or more microprocessors (MCUs) electrically connected to the bus connector and the plurality of transceivers. The one or more MCUs may transmit, via one or more transceivers of the plurality of transceivers, signals simulating communication with and/or from the accessory system. The one or more MCUs may further receive the signals simulating communication with and/or from the accessory system. The system may include a void seal. The void seal, when attached to the bus connector, prevents the accessory system from being connected to the bus connector, and when detached from the bus connector, the one or more MCUs stop transmitting the signals simulating communication with and/or from the accessory system.

18 Claims, 4 Drawing Sheets

(56) References Cited

U.S. PATENT DOCUMENTS

| | | | | |
|---|---|---|---|---|
| 2019/0143935 | A1* | 5/2019 | Flick | G07C 5/08 701/2 |
| 2019/0379682 | A1* | 12/2019 | Overby | H04L 12/40 |
| 2020/0026678 | A1* | 1/2020 | Kennedy | G06F 13/4022 |
| 2020/0032552 | A1* | 1/2020 | Parfitt | E05B 51/005 |
| 2020/0211301 | A1* | 7/2020 | Zhang | H04L 63/065 |
| 2020/0213287 | A1* | 7/2020 | Zhang | H04L 63/123 |
| 2020/0351168 | A1* | 11/2020 | Hirano | H04L 41/142 |
| 2021/0237765 | A1 | 8/2021 | Ando | |
| 2023/0399000 | A1 | 12/2023 | Dingli et al. | |
| 2024/0020049 | A1* | 1/2024 | Bert | G06F 3/0655 |
| 2024/0385985 | A1* | 11/2024 | Lindow | H04L 12/4641 |
| 2025/0202864 | A1* | 6/2025 | Ante | H04L 61/5038 |

FOREIGN PATENT DOCUMENTS

| | | | |
|---|---|---|---|
| EP | 3533654 | A1 | 4/2019 |
| JP | 2023141422 | A | 10/2023 |
| WO | 2021185466 | A1 | 9/2021 |
| WO | 2022219948 | A1 | 10/2022 |

* cited by examiner

METHODS, SYSTEMS, AND DEVICES FOR SIMULATING A CONNECTION BETWEEN A VEHICLE CONNECTOR AND AN ACCESSORY SYSTEM

BACKGROUND

1. Field

The present disclosure relates to methods, systems, and/or devices for simulating a connection between a vehicle connector and an accessory system.

2. Description of the Related Art

Some vehicles, such as mobility as a service (MaaS) vehicles, may be manufactured to interface with one or more third-party accessory systems. For example, a vehicle manufacturer may produce a vehicle that is ready to have a third-party accessory system installed on the vehicle (e.g., a camera system). The vehicle may be delivered to a purchaser (e.g., a robo-taxi service provider) without the third-party accessory system installed, with the purchaser having to install the third-party accessory system. This results in the manufacturer not being able to test circuitry within the vehicle that interfaces with the third-party accessory system before delivering the vehicle, and the vehicle logging fault codes due to electronic control units (ECUs) of the vehicle expecting a connection with the third-party accessory system but not detecting a connection.

Accordingly, it is desirable to provide methods, systems, and devices for simulating a connection between a vehicle connector and an accessory system.

SUMMARY

In general, one aspect of the subject matter described in this disclosure may be embodied in a connection simulator system for simulating a connection between a vehicle and an accessory system. The connection simulator system may include a vehicle bus connector configured to connect with the accessory system. The connection simulator system may further include a plurality of transceivers. The plurality of transceivers may transmit and receive signals. The connection simulator system may further include one or more microprocessors (MCUs) electrically connected to the vehicle bus connector and the plurality of transceivers. The one or more MCUs may transmit, via one or more transceivers of the plurality of transceivers, signals simulating communication with and/or from the accessory system. The one or more MCUs may further receive, via another one or more transceivers of the plurality of transceivers and from the one or more transceivers, the signals simulating communication with and/or from the accessory system. The connection simulator system may further include a void seal. When attached to the vehicle bus connector, the void seal may prevent the accessory system from being connected to the vehicle bus connector. When the void seal is detached from the vehicle bus connector, the one or more MCUs may stop transmitting the signals simulating communication with and/or from the accessory system.

In one aspect, the subject matter may be embodied in a connection simulator system for simulating a connection between a vehicle and an accessory system. The connection simulator system may include a controller area network (CAN) bus connector. The CAN bus connector may be configured to connect with the accessory system. The connection simulator system may further include an electronic control unit (ECU) electrically connected to the CAN bus connector. The ECU may include a plurality of transceivers. The plurality of transceivers may transmit and receive CAN signals. The ECU may further include one or more microprocessors (MCUs) electrically connected to the plurality of transceivers. The one or more MCUs may transmit, via one or more transceivers of the plurality of transceivers, CAN signals simulating communication with and/or from the accessory system. The one or more MCUs may further receive, via another one or more transceivers of the plurality of transceivers, the CAN signals simulating communication with and/or from the accessory system. The connection simulator system may include a void seal. When attached to the CAN bus connector, the void seal may prevent the accessory system from being connected to the CAN bus connector. When the void seal is detached from the CAN bus connector, the one or more MCUs may stop transmitting the CAN signals simulating communication with and/or from the accessory system.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Disclosed herein are methods, systems, devices, and/or vehicles for implementing a connection simulator system. Particular embodiments of the subject matter described in this disclosure may be implemented to realize one or more of the following advantages. The connection simulator system may simulate a connection between an electronic control unit (ECU) of a vehicle (e.g., a mobility as a service (MaaS) vehicle or other vehicle) and an accessory system (e.g., an autonomous driving kit (ADK) or other accessory system) when the accessory system is not connected to the ECU to prevent fault codes from being produced and/or logged and/or to test circuitry of the ECU that interfaces with the accessory system. The connection simulator system may simulate the connection by generating, transmitting, and then receiving signals that simulate communication with and/or from the accessory system when a void seal (or connector cover) is attached to a connector (or bus connector) of the ECU. The connection simulator system may stop simulating the connection when the void seal is removed (e.g., by a user) from the connector of the ECU.

The connection simulator system enables a manufacturer to test the circuitry of the ECU that interfaces with the accessory system without having to install the accessory system and before shipping the vehicle to a purchaser. Moreover, the connection simulator system enables the manufacturer to ship the vehicle to the purchaser without the vehicle having fault codes already logged due to communication failures with the uninstalled accessory system. This may streamline the manufacturing process by allowing the vehicle to be quality tested in one location instead of having to test the vehicle at the location it is manufactured and at a second location where the accessory system is installed.

Moreover, the void seal of the connection simulator system may be configured such that the void seal cannot be reattached once removed and/or configured such that the void seal provides a visual indication that the void seal has been removed at some point in time and/or tampered with. This may be valuable information for warranty claims for the manufacturer and/or the purchaser of the vehicle.

Moreover, the connection simulator system may transmit an indication to a remote server when the void seal is removed from the bus connector. This may enable the vehicle manufacturer to monitor when the accessory system is installed on the vehicle which may be helpful for warranty and/or service claims.

Figure 1:
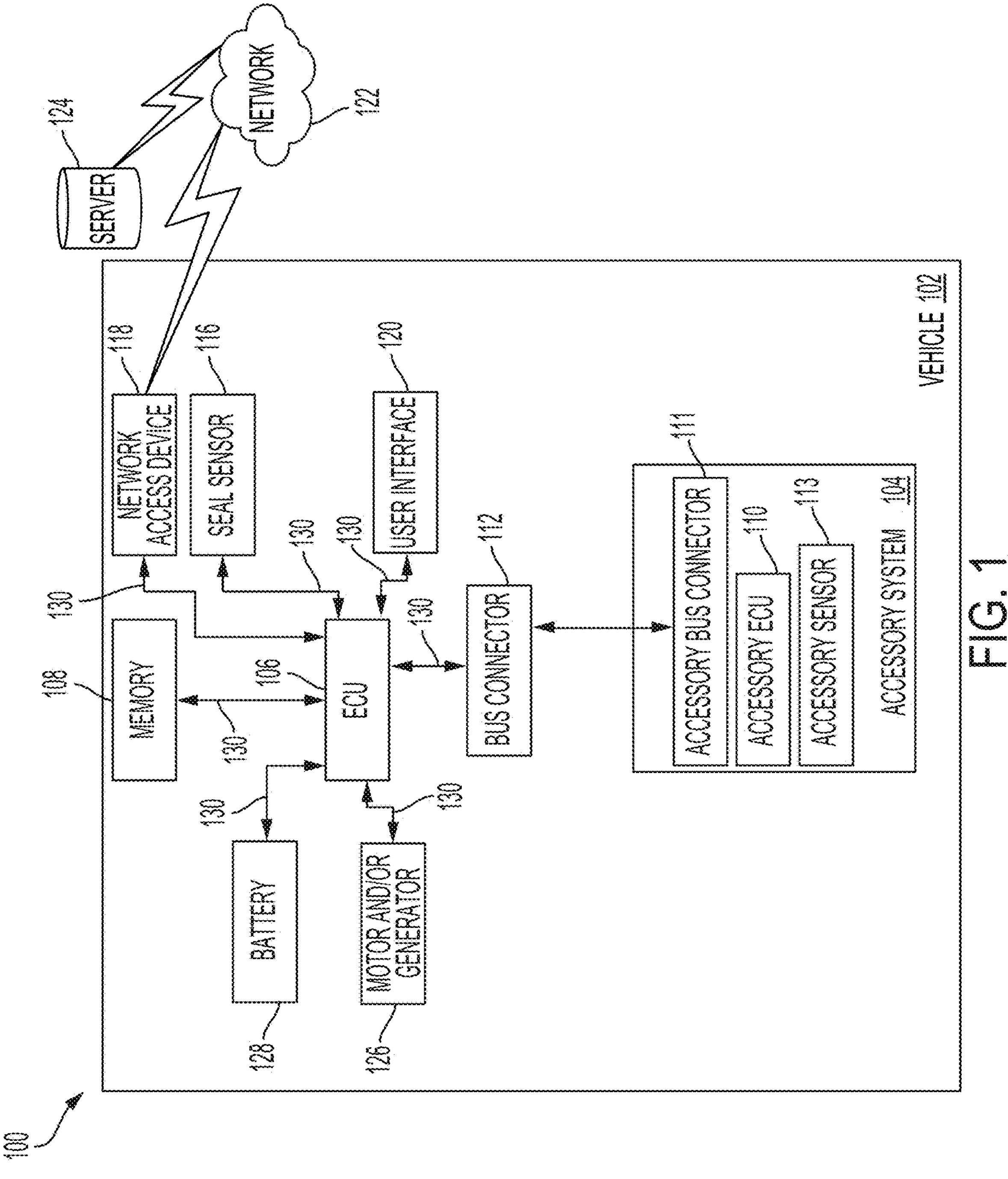
FIG. 1 is a block diagram of an example connection simulator system for a vehicle according to an aspect of the disclosure.

FIG. 1 is a block diagram of an example connection simulator system 100 for simulating a connection between a vehicle 102 and an accessory system 104. The connection simulator system 100 or a portion thereof may be retrofitted, coupled to, include, or be included within the vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The connection simulator system 100 and/or the vehicle 102 may include a motor and/or generator 126 and/or a battery 128. The motor and/or generator 126 may be located within an engine bay of the vehicle 102. The motor and/or generator 126 may be an internal combustion engine (ICE). In this regard, the motor and/or generator 126 may combust an air and fuel mixture to provide power to the vehicle 102 and/or components of the vehicle 102 and/or the connection simulator system 100. Accordingly, the motor and/or generator 126 can cause the vehicle 102 to accelerate, decelerate, or maintain a desired velocity. It should be understood that the motor and/or generator 126 may include combinations of an ICE and an electric motor, such as for hybrid vehicle applications for example. In examples, the motor and/or generator 126 may be an electric motor. In this regard, the motor and/or generator 126 may be an electric motor and an electric generator that converts electrical energy into mechanical power, such as torque, and converts mechanical power into electrical energy. The motor and/or generator 126 may be electrically connected to the battery 128. The motor and/or generator 126 may convert energy from the battery 128 into mechanical power, and may provide energy back to the battery 128, for example, via regenerative braking. The battery 128 may be electrically connected to the motor and/or generator 126 and may provide electrical energy to and/or receive electrical energy from the motor and/or generator 126. The battery 128 may provide electrical energy to the connection simulator system 100.

The connection simulator system 100 and/or the vehicle 102 may further include a vehicle bus 130. In examples, the connection simulator system 100 may include a plurality of vehicle buses. The vehicle bus 130 may connect and pass signals between some or all of the components of the vehicle 102 and/or the connection simulator system 100. The vehicle bus 130 may be and/or include a controller area network (CAN) bus, a media oriented systems transport (MOST) bus, a local interconnect network (LIN) bus, a FlexRay® bus, and/or other communication protocols.

The connection simulator system 100 and/or the vehicle 102 may further include one or more processors, such as an electronic control unit (ECU) 106. The ECU 106 may be implemented as a single ECU or in multiple ECUs. The ECU 106 may be and/or include one or more processors, microprocessors, and/or controllers specifically designed for communicating with the accessory system 104 and/or controlling one or more operations of the vehicle 102 (e.g., steering, accelerating, braking, controlling a panoramic view monitor (PVM) of the vehicle 102, etc.). In examples, the ECU 106 may be and/or include an advanced driver assistance systems (ADAS) sensor fusion ECU, a panoramic view monitor (PVM) ECU, an engine control module (ECM), a transmission control module (TCM), a telematics control unit (TCU), an in-vehicle infotainment (IVI) ECU, and/or a graphics processing unit (GPU). The ECU 106 may be electrically connected to some or all of the components of the vehicle 102 and/or the connection simulator system 100 (e.g., via the vehicle bus 130). The ECU 106 may be electrically connected to the motor and/or generator 126, the battery 128, a memory 108, a bus connector 112, a user interface 120, one or more seal sensors 116, and/or a network access device 118.

In examples, the ECU 106 may be and/or include a vehicle control interface box (VCIB) ECU. The VCIB ECU may be an interface ECU that enables one or more accessory systems (e.g., the accessory system 104) to interface with and/or control the vehicle 102 and/or be controlled by the vehicle 102. For example, the VCIB ECU may generate, transmit, receive, and/or relay communications (or signals) between the vehicle 102 and the accessory system 104.

The connection simulator system 100 and/or the vehicle 102 may further include the memory 108. The memory 108 may be electrically connected to the ECU 106. In examples, the memory 108 may be communicatively coupled (e.g., via a network 122) to the ECU 106 such that the memory 108 is remote from the ECU 106 and/or the vehicle 102. In other examples, the memory 108 may be electrically connected to the ECU 106 and a remote memory (e.g., a remote database) may be communicatively coupled to the ECU 106, with the remote memory having similar, additional, and/or different functions as the memory 108 (e.g., greater storage capacity, enabling over-the-air updates, etc.). The memory 108 may store instructions to execute on the ECU 106 and may include one or more of a random access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The memory 108 may store vehicle parameters (e.g., vehicle weight, vehicle length, vehicle width, vehicle height, transmission gear information, etc.).

The connection simulator system 100 may further include the bus (or vehicle bus or vehicle) connector 112. In examples, the connection simulator system 100 may include a plurality of bus connectors. The bus connector 112 may be and/or include one or more data connectors or terminals and/or one or more power connectors or terminals. The bus connector 112 may be electrically connected to and/or coupled to the ECU 106. The bus connector 112 may be configured to connect with one or more accessory systems (e.g., the accessory system 104) to enable communication between the ECU 106 and the one or more accessory systems. The bus connector 112 may, for example, be a CAN bus connector that is configured to connect the ECU 106 with the one or more accessory systems. In examples, the bus connector 112 may be an independent connector or may be included within a larger connector electrically connected to the ECU 106 and having additional power and/or data terminals.

The connection simulator system 100 may further include the accessory system 104. In examples, the connection simulator system 100 may include a plurality of accessory systems. The accessory system 104 may be located on or within the vehicle 102 and may be electrically connected to the vehicle 102 (e.g., via the bus connector 112). For example, the accessory system 104 may be coupled to a roof, a front bumper, and/or a rear bumper of the vehicle 102. In examples, the accessory system 104 may be an autonomous driving kit (ADK) that may provide autonomous driving capabilities to the vehicle 102. The accessory system 104 may provide the vehicle 102 with additional sensing, lighting, and/or communication capabilities. In examples, the accessory system 104 may be a third-party accessory system that is retrofitted to the vehicle 102 by a purchaser of the vehicle 102. The accessory system 104 may include an accessory bus connector 111, one or more accessory sensors 113, and/or an accessory ECU 110.

The accessory bus connector 111 may be electrically connected to and/or coupled to the accessory ECU 110. The accessory bus connector 111 may be and/or include one or more data connectors or terminals and/or one or more power connectors or terminals. The accessory bus connector 111 may be configured to connect with the bus connector 112 of the vehicle 102 to enable communication between the vehicle 102 and the accessory system 104 (e.g., via the ECU 106 and the accessory ECU 110). In examples, the accessory bus connector 111 may be a CAN bus connector.

The one or more accessory sensors 113 may be located on or within the accessory system 104 and/or the vehicle 102. The one or more accessory sensors 113 may be and/or include one or more cameras, one or more spatial and/or object sensors (e.g., lidar sensors, radar sensors, sonar sensors, etc.), one or more microphones, and/or additional sensors. In examples, the one or more accessory sensors 113 may detect one or more objects and/or aspects within a surrounding area of the vehicle 102 to enable autonomous and/or semi-autonomous driving of the vehicle 102. For example, the one or more accessory sensors 113 may detect vehicles, pedestrians, road features, and/or other objects and/or aspects within the surrounding area of the vehicle 102.

The accessory ECU 110 may be implemented as a single ECU or in multiple ECUs. The accessory ECU 110 may be and/or include one or more processors, microprocessors, and/or controllers specifically designed for controlling one or more operations of the vehicle 102 for autonomous driving, such as steering, accelerating, braking, etc. The accessory ECU 110 may be electrically connected to the accessory bus connector 111 and/or the one or more accessory sensors 113. In examples, the accessory ECU 110 may receive sensor data from the one or more accessory sensors 113. The sensor data may indicate detected vehicles, pedestrians, road features, and/or other objects and/or aspects within the surrounding area of the vehicle 102. The accessory ECU 110 may control (e.g., via the ECU 106) the one or more operations of the vehicle 102 based on the received sensor data.

Figure 2:
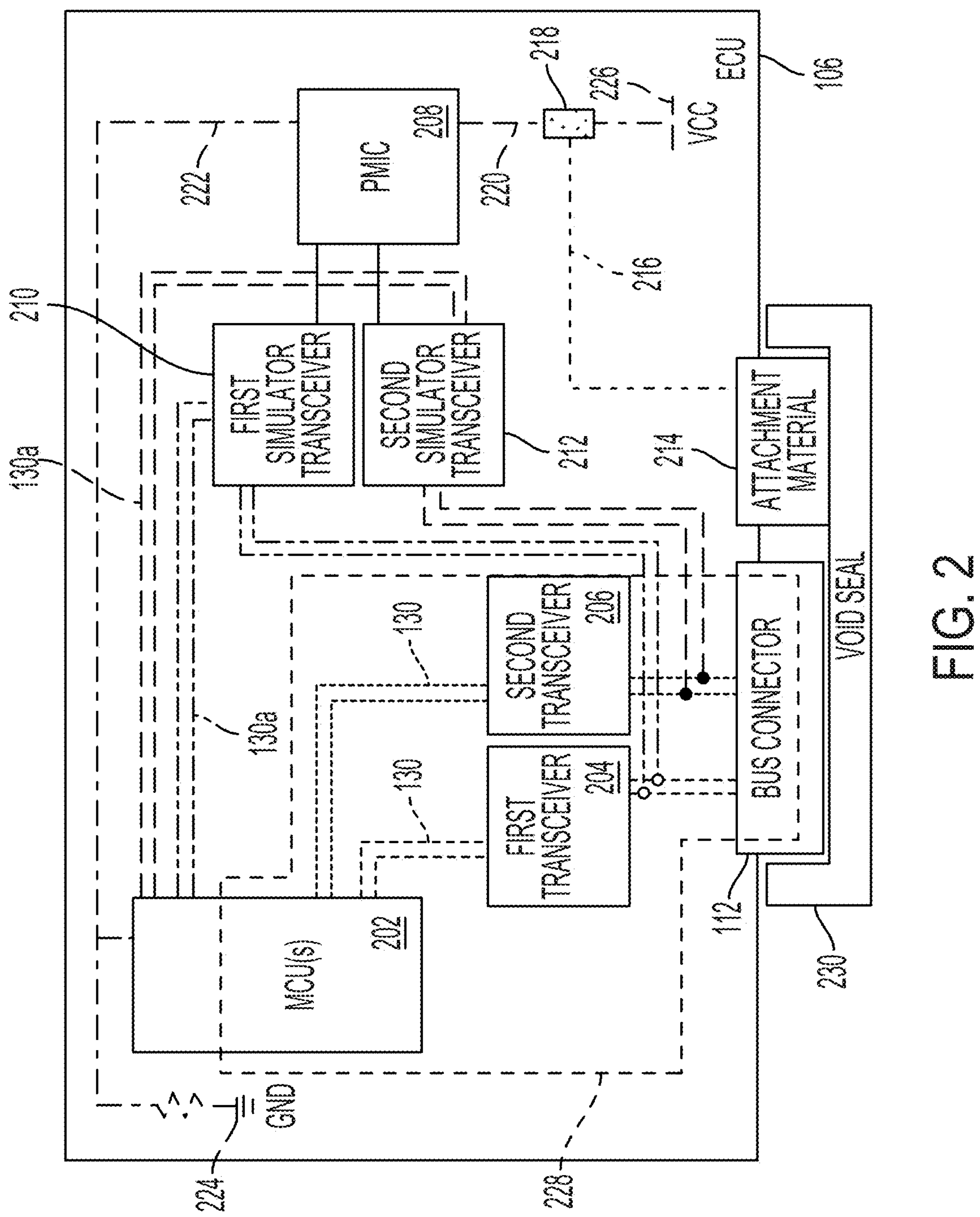
FIG. 2 is a schematic of an example electronic control unit (ECU) of the example connection simulator system of FIG. 1 according to an aspect of the disclosure.

FIG. 2 is a block diagram of an example ECU 106 of the connection simulator system 100. Referring to FIG. 2 with continuing reference to FIG. 1, the connection simulator system 100 and/or the ECU 106 may include one or more transceivers 204, 206, 210, and 212, a power management integrated circuit (PMIC) 208, one or more microprocessors (MCUs) 202, a void seal 230, an attachment material 214, and/or the bus connector 112. The one or more transceivers 204, 206, 210, and 212 may include a first transceiver 204, a second transceiver 206, a first simulator (or third) transceiver 210, and/or a second simulator (or fourth) transceiver 212. In examples, the first transceiver 204, the second transceiver 206, the one or more MCUs 202, and/or the bus connector 112 may be native (or integrated) components 228 of the ECU 106 and the first simulator transceiver 210, the second simulator transceiver 212, the PMIC 208, the attachment material 214, and/or the void seal 230 are retrofitted to the ECU 106.

In examples, the ECU 106 may include two transceivers (e.g., the first transceiver 204 and the first simulator transceiver 210). Each of the one or more transceivers 204, 206, 210, and 212 may be the same (i.e., the one or more transceivers 204, 206, 210, and 212 are duplicates of each other). In examples, each or some of the one or more transceivers 204, 206, 210, and 212 may be different (e.g., using different communication protocols). In examples, the first transceiver 204 is a duplicate of the second transceiver 206, and the first simulator transceiver 210 is a duplicate of the second simulator transceiver 212.

The first transceiver 204 and/or the second transceiver 206 may be electrically connected (e.g., via the vehicle bus 130) to the one or more MCUs 202 and the bus connector 112. The first transceiver 204 and/or the second transceiver 206 may be configured to enable communication between the one or more MCUs 202 and the accessory system 104 when the accessory system 104 is connected to the bus connector 112. For example, the first transceiver 204 and/or the second transceiver 206 may be configured to convert signals received from the one or more MCUs 202 and/or the accessory system 104. In examples, the first transceiver 204 and/or the second transceiver 206 may be configured to convert digital signals received from the one or more MCUs 202 to differential voltage signals, and may then transmit the differential voltage signals to the accessory system 104. Moreover, the first transceiver 204 and/or the second transceiver 206 may be configured to convert differential voltage signals received from the accessory system 104 to digital signals, and may then transmit the digital signals to the one or more MCUs 202.

The first simulator transceiver 210 may be electrically connected (e.g., via the vehicle bus 130) to the first transceiver 204 and/or the one or more MCUs 202. The second simulator transceiver 212 may be electrically connected (e.g., via the vehicle bus 130) to the second transceiver 206 and/or the one or more MCUs 202. The first simulator transceiver 210 and/or the second simulator transceiver 212 may be configured to receive and/or transmit signals and/or signals simulating communication between the one or more MCUs 202 and the accessory system 104 when the void seal 230 is attached to the bus connector 112 and the accessory system 104 is not connected to the bus connector 112. For example, the first simulator transceiver 210 and/or the second simulator transceiver 212 may receive communications (or signals) from the one or more MCUs 202 that simulate communications (or signals) coming from the accessory system 104. The first simulator transceiver 210 and/or the second simulator transceiver 212 may transmit the received communications (or signals) to the first transceiver 204 and/or the second transceiver 206. The first transceiver 204 and/or the second transceiver 206 may transmit the communications (or signals) received from the first simulator transceiver 210 and/or the second simulator transceiver 212 to the one or more MCUs 202 such that the communications (or signals) appear to have been transmitted from the accessory system 104.

The PMIC 208 may be electrically connected to the one or more MCUs 202 (e.g., via a feedback line 222), the one or more transceivers 204, 206, 210, and 212, an integrated circuit (IC) power supply pin 226 (e.g., VCC) (e.g., via a power supply line 220), and/or a ground pin 224. In examples, the ECU 106 may include a plurality of PMICs. The PMIC 208 may be configured to receive electrical energy from the IC power supply pin 226 via the power supply line 220. The PMIC 208 may be further configured to control and/or provide the electrical energy to the first simulator transceiver 210 and/or the second simulator transceiver 212. In examples, the PMIC 208 may be further configured to control and/or provide the electrical energy to the one or more MCUs 202 and/or the one or more transceivers 204, 206, 210, and 212.

The one or more MCUs 202 may be electrically connected (e.g., via the vehicle bus 130) to the one or more transceivers 204, 206, 210, and 212 and/or the PMIC 208. The one or more MCUs 202 may be native to and/or integrated with the ECU 106 or may be retrofitted to the ECU 106. In examples, the ECU 106 may include a plurality of MCUs for redundancy to increase functional safety of the vehicle 102. For example, the one or more MCUs 202 may include a first MCU electrically connected to the first transceiver 204 (and/or the first simulator transceiver 210) and a second MCU electrically connected to the second transceiver 206 (and/or the second simulator transceiver 212) to prevent a communication failure by duplicating communication channels between the accessory system 104 and the vehicle 102 (in examples, the ECU 106 may include any number of MCUs 202 and/or any number of transceivers).

The one or more MCUs 202 may be configured to communicate (e.g., via the first transceiver 204 and/or the second transceiver 206) with the accessory system 104 when the accessory system 104 is connected to the bus connector 112. The one or more MCUs 202 may be configured to simulate communication between the ECU 106 and the accessory system 104 when the void seal 230 is attached to the bus connector 112 and the accessory system 104 is not connected to the bus connector 112. For example, the one or more MCUs 202 may be configured to generate and/or transmit (or send) simulation signals that simulate communication (or signals or CAN signals) with and/or from the accessory system 104 when the void seal 230 is attached to the bus connector 112 and the accessory system 104 is not connected to the bus connector 112 (in examples, another ECU of the vehicle 102 may be configured to generate and/or transmit the simulation signals). In examples, the simulation signals generated by the one or more MCUs 202 may be simulations of the sensor data from the one or more accessory sensors 113. In examples, the simulation signals generated by the one or more MCUs 202 may be sensor feedback, CAN messages or signals, status information, and/or any other type of communication (or signal) used by the ECU 106 to communicate with and/or check the status of the accessory system 104.

The void seal 230 may be configured to removably attach to the bus connector 112. In examples, the void seal 230 may be a rigid material (e.g., a rigid plastic and/or metal) and/or a flexible material (e.g., a flexible plastic and/or metal). The void seal 230 may be a connector cover, a connector housing, or a dummy connector. In examples, the void seal 230 may be attached to the bus connector 112 via an adhesive. For example, the void seal 230 may be a sticker that may be detached from the bus connector 112 by being pulled (or pealed) off (e.g., by a user) from the bus connector 112. When the void seal 230 is attached to the bus connector 112, the accessory system 104 may be prevented from being connected to the bus connector 112. For example, the void seal 230 may be configured to at least partially cover and/or obstruct the bus connector 112 when the void seal 230 is attached to the bus connector 112 to prevent the accessory bus connector 111 from being connected to the bus connector 112.

In examples, the void seal 230 may include a cord (or string) 216. The cord 216 may be coupled to the void seal 230 (e.g., via an attachment material 214). In examples, the cord 216 may be nonconductive. The attachment material 214 may be an adhesive and/or a fastener (e.g., a screw, a nail, a staple, etc.). The cord 216 may be coupled to a jumper 218. In examples, the jumper 218 may be a low resistance material, a cable, a fuse, and/or a resister. The jumper 218 may be a portion of the power supply line 220. For example, when the void seal 230 is attached to the bus connector 112, the jumper 218 may complete an electrical connection (e.g., the power supply line 220) between the PMIC 208 and the IC power supply pin 226 as shown in FIG. 2. That is, when the void seal 230 is attached to the bus connector 112, the PMIC 208 receives electrical energy from the IC power supply pin 226 and is configured to provide the electrical energy to the first simulator transceiver 210 and/or the second simulator transceiver 212.

Moreover, the one or more MCUs 202 may be configured to determine whether the PMIC 208 is operational (i.e., receiving the electrical energy from the IC power supply pin 226) and/or whether the first simulator transceiver 210 and/or the second simulator transceiver 212 is receiving the electrical energy based on a voltage and/or a signal received from the PMIC 208 via the feedback line 222. For example, the one or more MCUs 202 may be configured to determine that the PMIC 208 is operational (and thus providing power to the first simulator transceiver 210 and/or the second simulator transceiver 212) when a measured and/or detected voltage on the feedback line 222 is greater than or equal to a threshold voltage (e.g., 1-48 volts). When the one or more MCUs 202 determine that the PMIC 208 is operational, the one or more MCUs 202 may be configured to generate and/or transmit the signals simulating communication with and/or from the accessory system 104.

When the void seal 230 is detached from the bus connector 112 (e.g., the void seal 230 is pulled off by a user), the cord 216 pulls the jumper 218 thereby breaking the electrical connection (e.g., the power supply line 220) between the PMIC 208 and the IC power supply pin 226. Thus, when the void seal 230 is detached from the bus connector 112, the PMIC 208 stops receiving electrical energy and stops providing the electrical energy to the first simulator transceiver 210 and/or the second simulator transceiver 212. Moreover, the one or more MCUs 202 may be configured to determine that the PMIC 208 is nonoperational (or disabled) when a measured and/or detected voltage on the feedback line 222 is less than the threshold voltage (e.g., 1-48 volts). For example, when the jumper 218 is removed from power supply line 220, the feedback line 222 may be pulled to the ground pin 224 voltage which is less than the threshold voltage. When the one or more MCUs 202 determine that the PMIC 208 is nonoperational, the one or more MCUs 202 may be configured to stop generating and/or transmitting the signals simulating communication with and/or from the accessory system 104. Thus, when the void seal 230 is detached from the bus connector 112, the one or more MCUs 202 may be configured to stop generating and/or sending the signals simulating communication with and/or from the accessory system 104.

In examples, when the void seal 230 is detached from the bus connector 112 (e.g., the void seal 230 is pulled off by a user), the void seal 230, the attachment material 214, the cord 216, and the jumper 218 are completely removed from the ECU 106. In examples, when the void seal 230 is detached from the bus connector 112, the native components 228 remain within and/or coupled to the ECU 106 and the first simulator transceiver 210, the second simulator transceiver 212, the PMIC 208, the void seal 230, the attachment material 214, the cord 216, and/or the jumper 218 are completely removed from the ECU 106 to ensure that noise is not created and/or caused by the first simulator transceiver 210, the second simulator transceiver 212, and/or the PMIC 208. For example, one or more of the first simulator transceiver 210, the second simulator transceiver 212, and/or the PMIC 208 may be coupled to the void seal 230 such that removing the void seal 230 from the bus connector 112 removes the first simulator transceiver 210, the second simulator transceiver 212, and/or the PMIC 208 from the ECU 106. In examples, removing the void seal 230 may break and/or remove portions of circuitry (e.g., via one or more cords and/or jumpers coupled to the void seal 230 and the portions of circuitry) between the one or more MCUs 202 and the first simulator transceiver 210 and/or the second simulator transceiver 212 (e.g., vehicle bus portions 130*a*) to prevent noise.

By simulating communication with and/or from the accessory system 104 when the void seal 230 is attached to the bus connector 112 and the accessory system 104 is not connected to the bus connector 112, the connection simulator system 100 may suppress faults and/or test (or exercise) the vehicle bus 130, the first transceiver 204, and/or the second transceiver 206. In examples, the ECU 106 may be configured such that no fault codes are generated immediately after the void seal 230 is removed. Instead, the ECU 106 may be configured to test and/or communicate with a presumably installed accessory system 104 when the vehicle 102 is powered up (or started) a subsequent time.

Without the connection simulator system 100, the vehicle 102 may generate fault codes due to communication failures when the accessory system 104 is not connected to the bus connector 112. For example, an ECU of the vehicle 102 may be configured to connect with an accessory system (e.g., the accessory system 104) and to communicate with the accessory system (e.g., by conducting status tests, transmitting and/or receiving signals, etc.). Thus, when the accessory system is not connected to the ECU, the ECU may generate fault codes due to failing to communicate with the accessory system and/or failing to receive expected communications (or signals). In addition, when the accessory system is not connected to the ECU, a vehicle manufacturer is not able to ensure proper operation of various components of the ECU that interface with the accessory system. Therefore, the connection simulator system 100 may be advantageous for vehicle manufactures who manufacture vehicles (e.g., the vehicle 102) having, for example, the ECU 106 but without, for example, the accessory system 104 connected to the ECU 106. The vehicle manufactures may confirm operation of the ECU 106 and/or other subsystems of the vehicles prior to selling the vehicles while the vehicles are in an unfinished state (i.e., the accessory system 104 is not yet installed and/or connected to the ECU 106). The vehicle manufactures may then sell the vehicles free of any logged failure diagnostic codes (i.e., fault codes) to purchasers who may then install various accessory systems (e.g., the accessory system 104) at another location.

Figure 3:
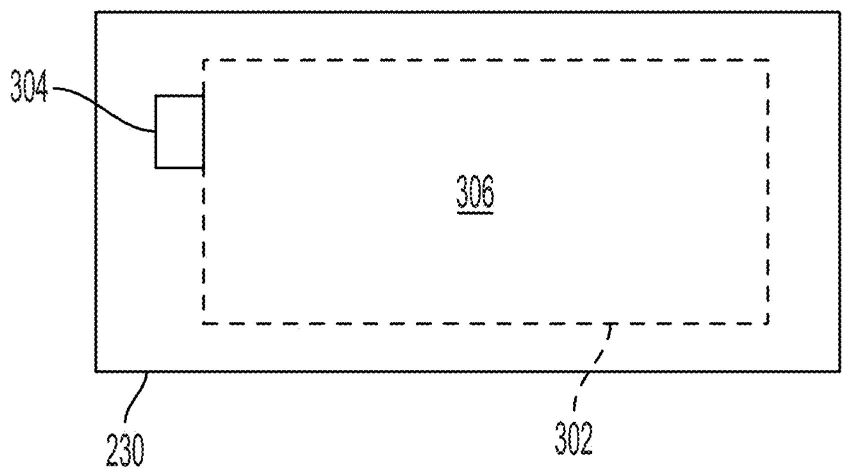
FIG. 3 is an illustration of a front view of an example void seal according to an aspect of the disclosure.
Figure 4:
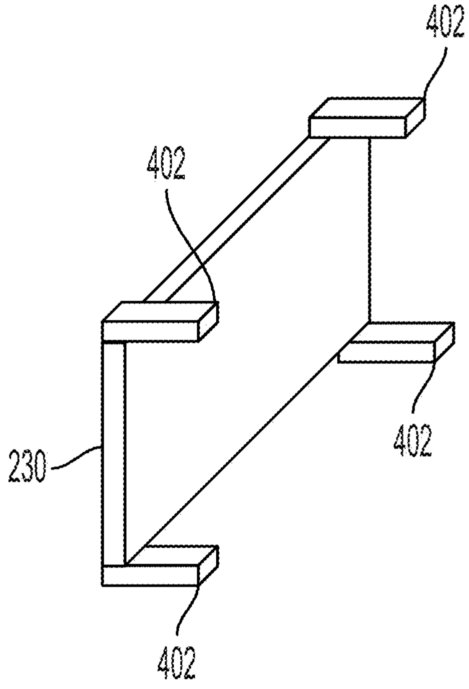
FIG. 4 is an illustration of a rear perspective view of an example void seal according to an aspect of the disclosure.

In examples, the void seal 230 may be configured such that when the void seal 230 is removed from the bus connector 112, the void seal 230 cannot be reattached to the bus connector 112. For example, referring briefly to FIG. 3 with continuing reference to FIGS. 1 and 2, the void seal 230 may have one or more pre-cut incisions 302 that are configured to snap or tear when a tab 304 and/or a portion 306 of the void seal 230 is pulled such that the portion 306 may be detached from the void seal 230 and/or the bus connector 112 to allow the accessory system 104 to be connected to the bus connector 112. Referring briefly to FIG. 4 with continuing reference to FIGS. 1 and 2, the void seal 230 may be attached to the bus connector 112 via one or more tabs 402. The one or more tabs 402 may be configured to snap or tear when the void seal 230 is pulled with a sufficient force such that the void seal 230 detaches from the bus connector 112. Thus, the pre-cut incisions 302 and/or the one or more tabs 402 may enable a user (e.g., a manufacturer or a purchaser of the vehicle 102) to confirm whether accessory systems (e.g., the accessory system 104) may have been previously installed on the vehicle 102 by checking whether the pre-cut incisions 302 and/or the one or more tabs 402 are intact and/or whether the void seal 230 is attached to the bus connector 112. This information may be helpful for any potential warranty claims and/or trouble shooting of the vehicle 102.

Referring again to FIG. 1 with continuing reference to FIG. 2, in examples, the connection simulator system 100 may further include the one or more seal sensors 116. The one or more seal sensors 116 may be coupled to the vehicle 102, the ECU 106, and/or the bus connector 112. In examples, the one or more seal sensors 116 may be and/or include a pressure sensor, a camera, a resistive sensor, a photosensor, and/or other sensors. The one or more seal sensors 116 may measure, detect (or indicate), and/or determine whether the void seal 230 is attached to the bus connector 112. The one or more seal sensors 116 may be in addition to or in place of the attachment material 214, the cord 216, and/or the jumper 218. For example, the one or more MCUs 202 may be configured to determine whether the void seal 230 is attached to the bus connector 112 based on data and/or an indication received from the one or more seal sensors 116.

In examples, the connection simulator system 100 may further include the user interface 120. The user interface 120 may be located within a cabin of the vehicle 102 and/or may be remote from the vehicle 102 (e.g., a mobile device). The user interface 120 may provide an interface to the user of the vehicle 102 to interact with and/or receive output from the ECU 106. The user interface 120 may have a user interface element, such as one or more screens and/or one or more touchscreens with a button, a switch, a microphone, a speaker, a gesture monitoring sensor, a knob, a graphical user interface (GUI), and/or other input/output devices electrically connected to the ECU 106 to provide input and/or output of information (or data) to and/or from the ECU 106. In examples, the user interface 120 may enable a user to check a status of the void seal 230. For example, the user interface 120 may be configured to display whether the connection simulator system 100 is simulating a connection between the ECU 106 and the accessory system 104 or whether the void seal 230 has been removed. In examples, the user interface 120 may be configured to display fault codes.

In examples, the connection simulator system 100 may further include the network access device 118. The network access device 118 may be electrically connected to the ECU 106 and may include a communication port or channel, such as one or more of a Wi-Fi unit, a Bluetooth® unit, a Radio Frequency Identification (RFID) tag or reader, a DSRC unit, and/or a cellular network unit for accessing the network 122 (e.g., CDMA, GSM, 3G, 4G, 5G, etc.). The network access device 118 may transmit data to and receive data from devices and systems not directly connected to the vehicle 102. For example, the ECU 106 may communicate with a server (or remote server) 124 via the network access device 118 and the network 122. In examples, the ECU 106 may be configured to transmit, via the network access device 118, an indication to the server 124 when the void seal 230 is removed from the bus connector 112. This may enable a manufacturer of the vehicle 102 to monitor when the void seal 230 is removed and/or when the accessory system 104 is installed on the vehicle 102.

Figure 5:
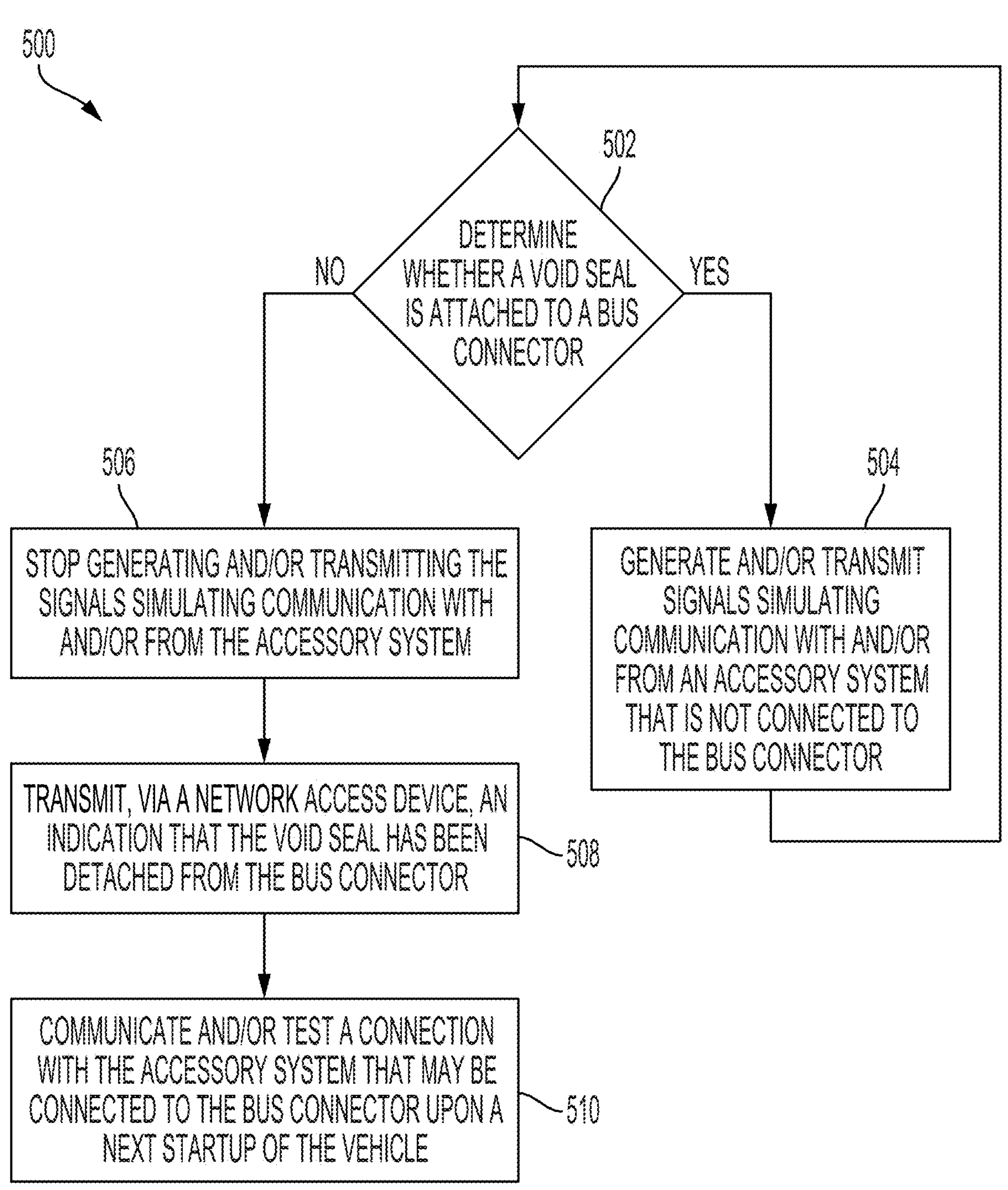
FIG. 5 is a flow diagram of an example process for controlling the connection simulator system of FIG. 1 according to an aspect of the disclosure.

FIG. 5 is a flow diagram of an example process 500 for controlling the connection simulator system 100. One or more computers or one or more data processing apparatuses, for example, the ECU 106 and/or the one or more MCUs 202 of the connection simulator system 100 of FIGS. 1 and 2, appropriately programmed, may implement the process 500. For ease of description, the process 500 is described below with reference to FIGS. 1-4. The process 500 of the present disclosure, however, is not limited to use of the exemplary connection simulator systems of FIGS. 1-4.

The connection simulator system 100 may determine whether the void seal 230 is attached to the bus connector 112 (502). To determine whether the void seal 230 is attached to the bus connector 112, the ECU 106 and/or the one or more MCUs 202 may be configured to determine that the void seal 230 is attached to the bus connector 112 when a voltage on the feedback line 222 is greater than or equal to a threshold voltage. In examples, the threshold voltage may be between 1-48 volts or more than 48 volts. In examples the threshold voltage may be stored on the memory 108.

When the connection simulator system 100 determines that the void seal 230 is attached to the bus connector 112 in block 502, the connection simulator system 100 may generate and/or transmit signals simulating communication with and/or from the accessory system 104 that is not connected to the bus connector 112 (504). The one or more MCUs 202 may generate and transmit the signals simulating communication with and/or from the accessory system 104 to the first simulator transceiver 210 and/or the second simulator transceiver 212. The first simulator transceiver 210 and/or the second simulator transceiver 212 may transmit the received signals simulating communication with and/or from the accessory system 104 to the first transceiver 204 and/or the second transceiver 206. The first transceiver 204 and/or the second transceiver 206 may transmit the signals simulating communication with and/or from the accessory system 104 (received from the first simulator transceiver 210 and/or the second simulator transceiver 212) to the one or more MCUs 202 such that the one or more MCUs 202 may interpret the signals as coming from the accessory system 104.

When the connection simulator system 100 determines that the void seal 230 is not attached to the bus connector 112 in block 502, the connection simulator system 100 may not generate and/or transmit or may stop generating and/or transmitting the signals simulating communication with and/or from the accessory system 104 (506).

The connection simulator system 100 may transmit, via the network access device 118, an indication to the server 124 that the void seal 230 has been detached from the bus connector 112 (508).

The connection simulator system 100 may communicate and/or test a connection with the accessory system 104 that may be connected to the bus connector 112 upon a next startup of the vehicle 102 (510).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A connection simulator system for simulating a connection between a vehicle and an accessory system, comprising:

- a vehicle bus connector configured to connect with the accessory system;
- a plurality of transceivers configured to transmit and receive signals;
- one or more microprocessors (MCUs) electrically connected to the vehicle bus connector and the plurality of transceivers and configured to:
  - transmit, via one or more transceivers of the plurality of transceivers, signals simulating communication with and/or from the accessory system, and
  - receive, via another one or more transceivers of the plurality of transceivers and from the one or more transceivers, the signals simulating communication with and/or from the accessory system; and
- a void seal configured to at least partially cover the vehicle bus connector when the void seal is attached to the vehicle bus connector to prevent the accessory system from being connected to the vehicle bus connector, and when detached from the vehicle bus connector, the one or more MCUs stop transmitting the signals simulating communication with and/or from the accessory system, the void seal having pre-cut incisions or one or more tabs configured to tear or snap when the void seal is detached or pulled from the vehicle bus connector.

2. The connection simulator system of claim 1, wherein the one or more MCUs are further configured to generate the signals simulating communication with and/or from the accessory system.

3. The connection simulator system of claim 2, wherein to transmit, via the one or more transceivers of the plurality of transceivers, the signals simulating communication with and/or from the accessory system, the one or more MCUs are configured to transmit the generated signals to the one or more transceivers and the one or more transceivers are configured to transmit the generated signals received from the one or more MCUs to the another one or more transceivers.

4. The connection simulator system of claim 1, wherein:

the one or more transceivers are further configured to receive electrical energy from a power supply line;

the one or more transceivers stop receiving the electrical energy when the void seal is detached from the vehicle bus connector;

the one or more MCUs are further configured to detect when the one or more transceivers stop receiving the electrical energy; and the one or more MCUs are configured to stop transmitting the signals simulating communication with and/or from the accessory system based on detecting when the one or more transceivers stop receiving the electrical energy.

5. The connection simulator system of claim 4, further comprising:

a cord coupled to the void seal and the power supply line; and wherein when the void seal is detached from the vehicle bus connector, the cord causes the power supply line to break or disconnect such that the one or more transceivers stop receiving the electrical energy.

6. The connection simulator system of claim 5, further comprising:

a jumper coupled to the cord and configured to form a portion of the power supply line; and wherein:

the cord is nonconductive, and when the void seal is detached from the vehicle bus connector, the cord causes the power supply line to break or disconnect by causing the jumper to be pulled from the power supply line.

7. The connection simulator system of claim 1, further comprising:

a network access device electrically connected to the one or more MCUs and configured to communicate with a remote server; and wherein the one or more MCUs are further configured to transmit, via the network access device, an indication to the remote server when the void seal is detached from the vehicle bus connector.

8. The connection simulator system of claim 1, further comprising:

the accessory system having an accessory bus connector configured to connect with the vehicle bus connector; and wherein the accessory system is an autonomous driving kit (ADK) configured to control one or more operations of the vehicle for autonomous driving.

9. A connection simulator system for simulating a connection between a vehicle and an accessory system, comprising:

a controller area network (CAN) bus connector configured to connect with the accessory system;

an electronic control unit (ECU) electrically connected to the CAN bus connector and including:

a plurality of transceivers configured to transmit and receive CAN signals, and one or more microprocessors (MCUs) electrically connected to the plurality of transceivers and configured to:

transmit, via one or more transceivers of the plurality of transceivers, CAN signals simulating communication with and/or from the accessory system, receive, via another one or more transceivers of the plurality of transceivers, the CAN signals simulating communication with and/or from the accessory system, and transmit, via the one or more transceivers of the plurality of transceivers, the received CAN signals simulating communication with and/or from the accessory system to the one or more transceivers and to the another one or more transceivers; and a void seal, when attached to the CAN bus connector prevents the accessory system from being connected to the CAN bus connector, and when detached from the CAN bus connector, the one or more MCUs stop transmitting the CAN signals simulating communication with and/or from the accessory system.

10. The connection simulator system of claim 9, wherein:

the ECU further includes a power management integrated circuit (PMIC) configured to receive electrical energy from an integrated circuit (IC) power supply pin of the ECU and provide the electrical energy to the one or more transceivers of the plurality of transceivers;

the one or more transceivers stop receiving the electrical energy when the void seal is detached from the CAN bus connector;

the one or more MCUs are further configured to determine or detect when the one or more transceivers stop receiving the electrical energy; and the one or more MCUs are configured to stop transmitting the CAN signals simulating communication with and/or from the accessory system based on determining or detecting when the one or more transceivers stop receiving the electrical energy.

11. The connection simulator system of claim 10, wherein to determine or detect when the one or more transceivers stop receiving the electrical energy, the one or more MCUs are configured to:

detect a voltage on a feedback line connected to the PMIC and the one or more MCUs; and determine or detect that the one or more transceivers have stopped receiving the electrical energy when the detected voltage is less than a threshold voltage.

12. The connection simulator system of claim 10, further comprising:

a cord coupled to the void seal; and wherein when the void seal is detached from the CAN bus connector, the cord is pulled and breaks or disconnects a power supply line between the IC power supply pin and the PMIC such that the one or more transceivers stop receiving the electrical energy.

13. The connection simulator system of claim 9, wherein the one or more MCUs are further configured to generate the CAN signals simulating communication with and/or from the accessory system.

14. The connection simulator system of claim 9, further comprising:

a network access device electrically connected to the one or more MCUs and configured to communicate with a remote server; and wherein the one or more MCUs are further configured to transmit, via the network access device, an indication to the remote server when the void seal is detached from the CAN bus connector.

15. The connection simulator system of claim 9, further comprising:

the accessory system having an accessory bus connector configured to connect with the CAN bus connector; and wherein the accessory system is an autonomous driving kit (ADK) configured to control one or more operations of the vehicle for autonomous driving.

16. The connection simulator system of claim 9, wherein the void seal is configured to at least partially cover the CAN bus connector when attached to the CAN bus connector to prevent the accessory system from being connected to the CAN bus connector.

17. The connection simulator system of claim 16, wherein the void seal has one or more pre-cut incisions or one or more tabs configured to tear or snap when the void seal is pulled from the CAN bus connector.

18. A connection simulator system for simulating a connection between a vehicle and an accessory system, comprising:

a vehicle bus connector configured to connect with the accessory system;

a plurality of transceivers including a transceiver and a simulator transceiver, the plurality of transceivers configured to transmit and receive signals;

one or more microprocessors (MCUs) electrically connected to the vehicle bus connector and the plurality of transceivers and configured to:

transmit, via the simulator transceiver, signals simulating communication with and/or from the accessory system, receive, via the simulator transceiver, the signals simulating communication with and/or from the accessory system; and a void seal, when attached to the vehicle bus connector prevents the accessory system from being connected to the vehicle bus connector, and when detached from the vehicle bus connector, the one or more MCUs stop transmitting and receiving the signals simulating communication with and/or from the accessory system and enable or start transmitting and receiving signals, via the transceiver, to and/or from the accessory system.

* * * * *